(12) United States Patent
Mochida

(10) Patent No.: US 12,499,475 B2
(45) Date of Patent: Dec. 16, 2025

(54) INDIVIDUAL ITEM PRICE MANAGEMENT SYSTEM AND METHOD OF MANAGING INDIVIDUAL ITEM PRICE MANAGEMENT SYSTEM

(71) Applicant: Toshiba Tec Kabushiki Kaisha, Tokyo (JP)

(72) Inventor: Yasuhiko Mochida, Numazu Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 286 days.

(21) Appl. No.: 18/322,947

(22) Filed: May 24, 2023

(65) Prior Publication Data

US 2024/0104614 A1    Mar. 28, 2024

(30) Foreign Application Priority Data

Sep. 22, 2022  (JP) .................................. 2022-150859

(51) Int. Cl.
*G06Q 30/0283* (2023.01)
*G06Q 20/20* (2012.01)

(52) U.S. Cl.
CPC ....... *G06Q 30/0283* (2013.01); *G06Q 20/201* (2013.01); *G06Q 20/202* (2013.01); *G06Q 20/203* (2013.01); *G06Q 20/208* (2013.01)

(58) Field of Classification Search
CPC ............. G06Q 30/0283; G06Q 20/201; G06Q 20/202; G06Q 20/203; G06Q 20/208;
(Continued)

(56) References Cited

U.S. PATENT DOCUMENTS 9,311,665 B2 *  4/2016  Mercado ............ G06Q 30/0603
10,963,658 B1 *  3/2021  Bloch .................... G06V 10/42
(Continued)

FOREIGN PATENT DOCUMENTS

WO         02/29661 A1      4/2002

OTHER PUBLICATIONS

Herbon, Avi, and Eugene Khmelnitsky. "Optimal dynamic pricing and ordering of a perishable product under additive effects of price and time on demand." European Journal of Operational Research 260.2 (2017): 546-556. (Year: 2017).*

(Continued)

*Primary Examiner* — Nathan A Mitchell
(74) *Attorney, Agent, or Firm* — Kim & Stewart LLP

(57) ABSTRACT

In accordance with an embodiment, an individual item management system includes an information terminal and an information processing apparatus. The information processing apparatus changes the price included in the product information in accordance with a predetermined rule according to a lapse of time from the reference date and time. The information processing apparatus acquires, upon receiving the identification information in units of the individual item from the information terminal, the product information that includes at least the reference date and time and the price and is stored in association with the identification information in units of the individual item from a storage device and transmits the acquired information to the information terminal.

1 Claim, 14 Drawing Sheets

(58) Field of Classification Search
CPC .............. G06Q 20/20; G06Q 30/0207; G06Q 30/0223; G06Q 30/0235; G06Q 30/0238; G06Q 10/087; G07G 1/0009; G07G 1/0036; G07G 1/0045; G07G 1/0054; G07G 1/145

See application file for complete search history.

(56) References Cited

U.S. PATENT DOCUMENTS

| | | | | |
|---|---|---|---|---|
| 11,182,811 | B2* | 11/2021 | Omer | G06Q 30/0206 |
| 2003/0216969 | A1* | 11/2003 | Bauer | G06K 17/00 |
| | | | | 705/22 |
| 2004/0210495 | A1* | 10/2004 | White | G07G 1/14 |
| | | | | 705/28 |
| 2006/0277109 | A1* | 12/2006 | Kerth | G06Q 20/4016 |
| | | | | 705/20 |
| 2010/0324972 | A1* | 12/2010 | Brooke | G06Q 30/0235 |
| | | | | 707/E17.014 |
| 2011/0153400 | A1* | 6/2011 | Averbuch | G06Q 30/02 |
| | | | | 705/28 |
| 2012/0095823 | A1* | 4/2012 | Tak | G06Q 30/0238 |
| | | | | 705/14.38 |
| 2014/0166741 | A1* | 6/2014 | Lizaka | G06K 7/1404 |
| | | | | 235/375 |
| 2015/0127439 | A1* | 5/2015 | Campos De Figueiredo Faceira | G06Q 30/0214 |
| | | | | 705/14.16 |
| 2015/0317667 | A1* | 11/2015 | Wohlert | G06Q 30/0643 |
| | | | | 705/14.35 |
| 2016/0110750 | A1* | 4/2016 | Jung | G06Q 30/0222 |
| | | | | 705/14.23 |
| 2018/0121777 | A1* | 5/2018 | Torrent | G06Q 10/08 |
| 2018/0329946 | A1* | 11/2018 | Gbur | G06K 19/06037 |
| 2019/0102788 | A1* | 4/2019 | Lewis | G06Q 30/0206 |
| 2022/0237642 | A1* | 7/2022 | Omer | G06Q 10/04 |
| 2022/0374857 | A1* | 11/2022 | Nakatsukasa | G06Q 20/20 |
| 2023/0237458 | A1* | 7/2023 | Okubo | G06Q 30/0235 |
| | | | | 705/23 |

OTHER PUBLICATIONS

Herbon, Avi, Eugene Levner, and T. C. E. Cheng. "Perishable inventory management with dynamic pricing using time-temperature indicators linked to automatic detecting devices." International Journal of Production Economics 147 (2014): 605-613. (Year: 2014).*

* cited by examiner

Fig.3

| Individual item code | Product code | Product name | Unit price | Date and time of manufacture | Stock status | Sales | Discount rule | Current price |

INDIVIDUAL ITEM PRICE MANAGEMENT SYSTEM AND METHOD OF MANAGING INDIVIDUAL ITEM PRICE MANAGEMENT SYSTEM

CROSS-REFERENCE TO RELATED APPLICATIONS

This application is based upon and claims the benefit of priority from the prior Japanese Patent Application No. 2022-150859, filed on Sep. 22, 2022, the entire contents of which are incorporated herein by reference.

FIELD

An embodiment to be described here generally relates to an individual item price management system and a method of managing an individual item price management system.

BACKGROUND

In the past, a product that requires freshness, such as milk, tofu, and ham, in addition to fresh food and fruits and vegetables, has been discounted taking into account the expiry date. In this way, stores promote sales by adding the value of low prices to products even if the products are somewhat old and take measures to prevent unsold products from being discarded.

As a system that supports the above-mentioned sales promotion through discounts or the like, in the past, for example, a discount sticker has been used to indicate that the product with the discount sticker is low-priced and the selling price of the product has been discounted in the case where the discount sticker is read together with a code symbol such as a barcode attached to the product.

However, for the system described above, for example, it is necessary for a sales clerk to perform manual work such as attaching a discount sticker to a product within a fixed timeframe such as several hours before the store closes. Further, although it is desirable that older products that were manufactured earlier sell faster, in the system described above, the situation where new products are likely to be picked up and old products are difficult to sell is left unattended until the time when discount stickers are attached is reached.

BRIEF DESCRIPTION OF THE DRAWINGS

FIG. 3 is a diagram showing an example of a data configuration of product information according to the embodiment.

DETAILED DESCRIPTION

Figure 1:
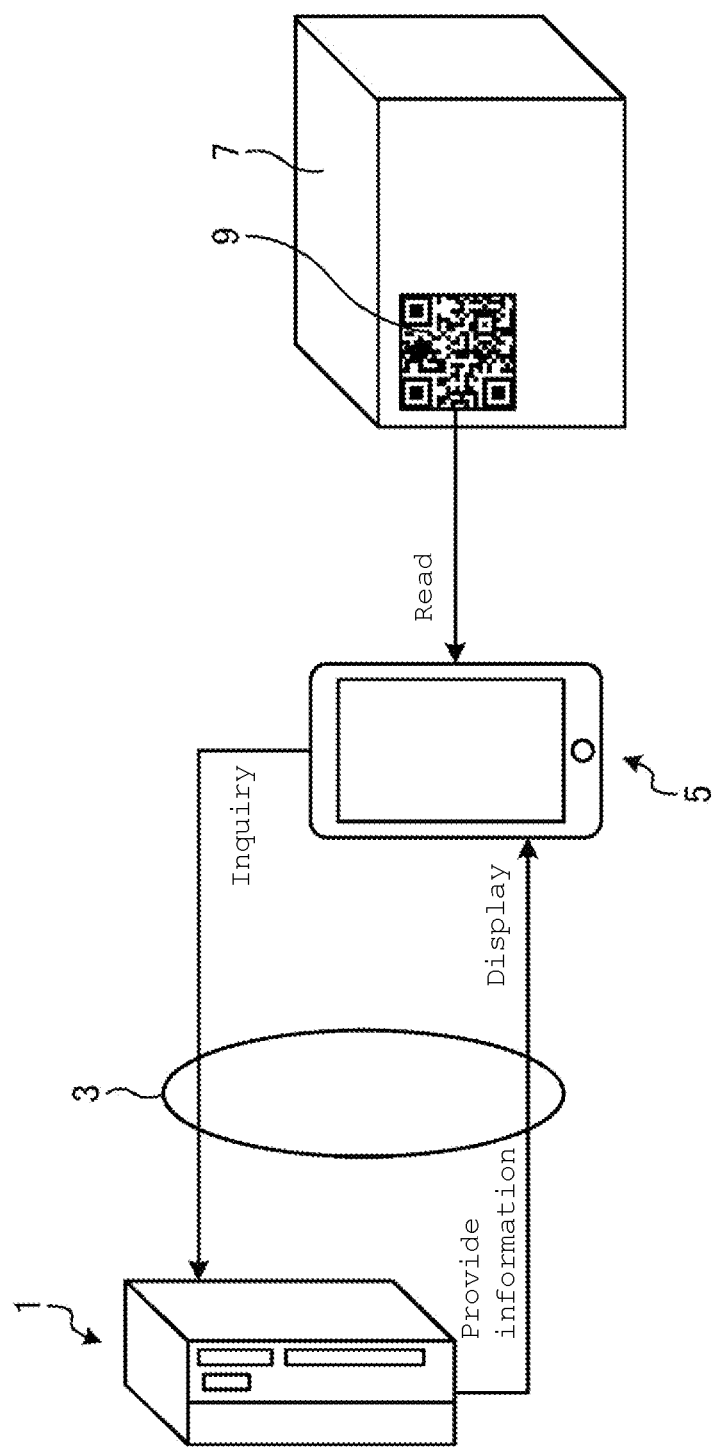
FIG. 1 is a schematic diagram showing a configuration of an individual item price management system according to an embodiment and a flow of information between configurations.

In accordance with an embodiment, an individual item price management system includes: an information terminal that acquires information for specifying a product to be traded; and an information processing apparatus that receives the information for specifying a product to be traded from the information terminal and performs processing relating to a transaction of the product. The information terminal includes an input device, a first communication device, a display device, and a first controller. The input device inputs, as the information for specifying a product, identification information in units of an individual item from one of a code symbol displayed on an outer surface of a product and a wireless tag attached to a product. The first communication device communicates with the information processing apparatus. The display device displays information regarding the product to be traded. The first controller is configured to acquire the identification information in units of the individual item via the input device. The first controller is further configured to transmit inquiry information including the acquired identification information in units of the individual item to the information processing apparatus via the first communication device. The first controller is further configured to receive response information to the inquiry information from the information processing apparatus via the first communication device. The first controller is further configured to display the response information on the display device. The information processing apparatus includes a second communication device, a storage device, and a second controller. The second communication device communicates with the information terminal. The storage device stores product information. The product information includes at least a reference date and time and a price of a product specified by the identification information in units of the individual item in association with the identification information in units of the individual item. The second controller is configured to change the price included in the product information stored in the storage device in accordance with a predetermined rule according to a lapse of time from the reference date and time included in the product information. The second controller is further configured to receive the inquiry information from the information terminal via the second communication device.

The second controller is further configured to acquire, from the storage device, the product information stored in association with the identification information in units of the individual item included in the received inquiry information. The second controller is further configured to transmit the acquired product information to the information terminal as the response information.

First Embodiment

An outline of an embodiment of an individual item price management system will be described. This embodiment deals with sales promotion of a product in which a lapse of time from a reference date and time affects the value of the product.

At present, in a store that offers discounts by attaching a sticker at a predetermined time, products are sold at the same price until the sticker is attached even if there is a difference in the date of manufacture of the product. For this reason, relatively new products with the same price are more likely to be picked up and older products are difficult to sell.

In order to improve the above-mentioned situation, this embodiment eliminates the need for timeframe restrictions and sticker attachment when changing prices. Further, this embodiment eliminates, in informing a customer of the changed price, the need for direct display on a product and enables customers to refer to the changed price at any time.

For this purpose, first, in the system according to this embodiment, a predetermined rule is provided and the price of a product is automatically changed in accordance with the rule. The above-mentioned rule follows a lapse of time from a reference date and time (e.g., the date and time of manufacture) stored in association with the product. For example, a product to which the rule is applied is automatically given a certain discount (price reduction) every time a certain period of time has elapsed since the date and time of manufacture.

Further, this system transmits, to a user terminal, information relating to a price change of a product to which the above-mentioned rule is applied. The user terminal is a terminal apparatus owned by a user. For example, in the case where the user terminal has read an individual item code attached to the product, the system transmits, to the user terminal, information regarding the product indicated by the individual item code. In this case, when the product indicated by the individual item code is a product that is discounted with a lapse of time from the date and time of manufacture, information relating to the price of the product after the discount is also transmitted to the user terminal. Note that the individual item code is an example of identification information, is a code for individual item management of the product, and is a code that enables identification of the individual item.

In this way, it is possible to make a product that has been hard to pick up because it is somewhat old be a product that is easy to pick up by giving the product an advantage in terms of price.

Further, in accordance with this system, although the discount will start earlier than before, since the price is automatically discounted by the system, it is possible to reduce the price in small increments, e.g., 1 to 2 yen, and thus to make a setting that does not lower the sales as compared with the conventional discount. Further, this makes relatively old products be easier to sell and it is conceivable that there is little risk of being disadvantaged even if the price is discounted early because the amount of waste is expected to be reduced.

Next, a configuration for realizing the system described above will be described with reference to the drawings. FIG. 1 is a schematic diagram showing a configuration of an individual item price management system according to an embodiment and a flow of information between configurations. As shown in FIG. 1, this system includes a server 1, a network 3, a user terminal 5, and the like. The network 3 is a network in a store, such as a local area network (LAN).

Further, in this system, assumption is made that a code symbol 9 is attached to a product 7. The code symbol 9 is one from which at least an individual item code can be obtained by decoding, such as a two-dimensional code. Note that the code symbol 9 and the individual item code are examples of identification information in units of an individual item.

The server 1 is an example of an information processing apparatus that performs processing relating to a transaction of a product and is installed in a store. The server 1 and the user terminal 5 are communicably connected to each other via the network 3.

The server 1 comprehensively manages sales data processing and the like performed by a point-of-sales (POS) terminal. For example, the server 1 stores and manages sales data generated by sales data processing of the POS terminal and stores and manages a product data file and the like to be used for the sales data processing.

The server 1 manages various types of information relating to transactions. Although the server 1 is a single apparatus in the example shown in FIG. 1, the server 1 may include a combination of a plurality of apparatuses in implementation. The server 1 transmits the stored information to an external apparatus (user terminal 5 or the like) in accordance with a request.

The user terminal 5 (example of an information terminal) is a terminal apparatus (customer terminal) owned by a user (customer) of this system and is used to receive information for specifying a product to be traded. As the user terminal 5, a mobile terminal such as a smartphone is used. The user terminal 5 is communicably connected to the server 1 via a public line or the network 3.

Note that an application for browsing various types of information provided by the server 1 is implemented in the user terminal 5.

The user terminal 5 accesses the server 1 via a public line or the network 3 to register as a member of this system. Membership registration for customers in this system is performed in, for example, the following procedure. The customer transmits a blank e-mail from the user terminal 5 to the server 1 via a public line. The server 1 transmits a uniform resource locator (URL) indicating a page for membership registration to the received e-mail address. The customer accesses the URL indicating a page for membership registration from the user terminal 5 to cause an input screen to be displayed and inputs items necessary for membership registration (a name, destination information, and the like) on the input screen. After the customer completes the input of the necessary items, the server 1 executes membership registration on a member master. After that, the server 1 delivers, to the user terminal 5, a membership registration completion e-mail including a membership code (example of information for specifying a customer) and a password. In this way, the membership registration is completed.

After the above-mentioned membership registration, the user terminal 5 displays the membership code of the customer as a code symbol such as a barcode and a two-dimensional code. The customer presents the code symbol displayed on the user terminal 5 to a sales clerk at the time of transaction payment. The sales clerk reads the code symbol displayed on the user terminal 5 with, for example, a scanner connected to the POS terminal. This makes it possible to associate the membership code of the customer with receipt data generated after the payment by sales data processing performed by the POS terminal.

Figure 2:
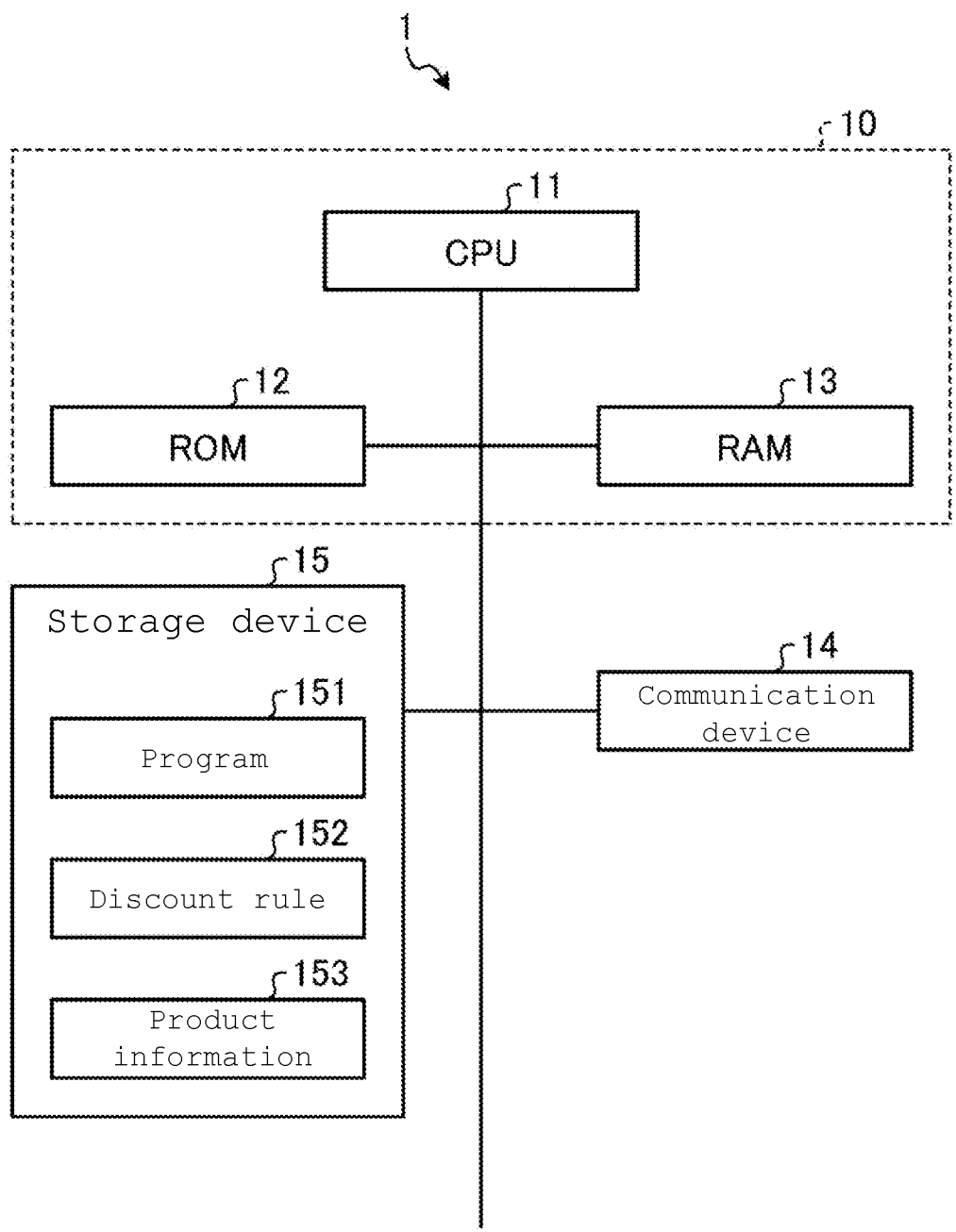
FIG. 2 is a block diagram showing an example of a hardware configuration of a server according to the embodiment.

FIG. 2 is a block diagram showing an example of a hardware configuration of the server 1. As shown in FIG. 2, the server 1 includes a CPU 11, a ROM 12, a RAM 13, a communication device 14, and a storage device 15.

The CPU 11 is an example of a processor and integrally controls the operation of the server 1. The ROM 12 stores various programs. The RAM 13 is a work space in which programs and various types of data are developed by the CPU 11.

The CPU 11, the ROM 12, and the RAM 13 are connected to each other via a bus and constitute a controller 10 having a computer configuration. In the controller 10, the CPU 11 operates in accordance with the program that is stored in the ROM 12 or the storage device 15 and developed into the RAM 13, thereby executing various types of processing. Such a controller 10 is connected to the respective units (the storage device 15 and the communication device 14) via the bus.

The communication device 14 is a wired or wireless communication interface connectable to the network 3. The communication device 14 communicates with various external apparatuses (the user terminal 5 and the like) via the network 3.

The storage device 15 includes a hard disk drive (HDD), a flash memory, or the like and maintains the stored content even when power is cut off. The storage device 15 stores various programs to be executed by the CPU 11 and various types of setting information relating to the operation of the server 1. Further, the storage device 15 stores a program 151, a discount rule 152, product information 153, and the like.

The program 151 is for causing the CPU 11 that executes the program 151 to realize various functional units.

The product information 153 and other various types of information (e.g., the discount rule 152) are organized in, for example, the form of a table and stored in different storage regions of the storage device 15 assigned thereto. Note that although the product information 153 and other information are stored in the same storage device 15 in this embodiment, they may be stored in storage devices of different apparatuses in carrying out the embodiment.

Regarding the content of the discount rule 152, the price of a product specified by a product code is changed by a predetermined amount, for example, every time a second time period has elapsed from the time point when a first time period elapsed from the date and time of manufacture. The first time period may be zero hour. The predetermined amount is set to, for example, a discount amount (e.g., 1 yen or 2 yen). Further, if the price can increase as well as decrease, the discount amount may be a negative number and the price increase amount may be a positive number. Further, the discount rule 152 is not limited to one type and a plurality of types may be set. In this case, of the plurality of discount rules 152, the selected one is set as the product information 153 of the product to which the rule is applied.

FIG. 3 is a diagram showing an example of a data configuration of the product information 153. The product information 153 includes an individual item code, a product code, a product name, a unit price, a date and time of manufacture, a stock status, a sales status, a discount rule, a current price, and the like. The product code is determined for each product and is a code capable of specifying a product. The individual item code is a code capable of individually identifying a plurality of products having the same product code and is recorded in the code symbol 9 attached to the product 7. The product name is the name of a product. The unit price is the price for one product.

The date and time of manufacture is an example of a reference date and time and is the date and time of manufacture of the product indicated by the individual item code. The stock status is a status of stock of the product indicated by the individual item code, and one of pre-display, display, registered, and sold is described in the stock status, for example.

The sales status is a status of sales of the product indicated by the product code, and one of "good" and "bad" is described in the sales status, for example. Of the discount rule 152 stored in the storage device 15, information indicating one to be applied to the product indicated by the product code is described in the discount rule.

The current price is the current price of the product indicated by the individual item code, and the amount of money equal to or less than the unit price determined in accordance with the discount rule is described in the current price.

Figure 4:
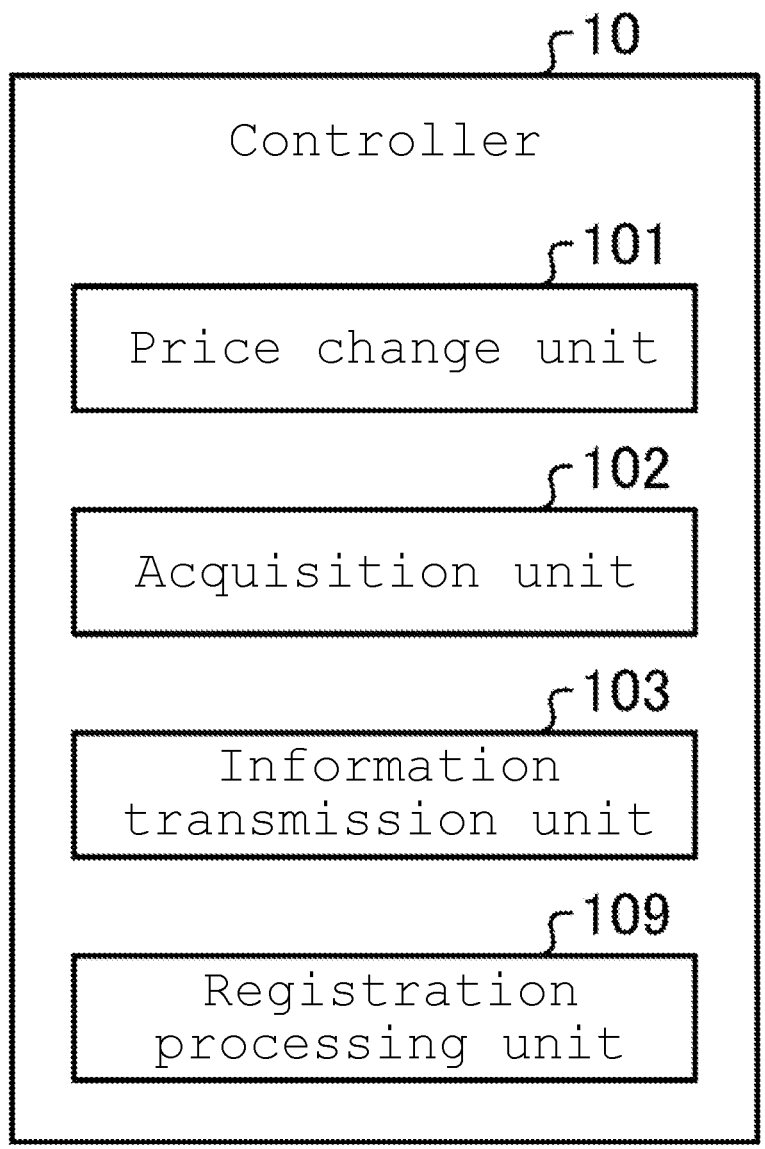
FIG. 4 is a diagram showing an example of a functional configuration of a controller of the server according to the embodiment.

FIG. 4 is a diagram showing an example of a functional configuration of the controller 10 of the server 1. The controller 10 functions as a price change unit 101, an acquisition unit 102, an information transmission unit 103, and a registration processing unit 109 when the CPU 11 executes the program 151.

The price change unit 101 changes the current price included in the product information 153 in accordance with a predetermined rule according to a lapse of time from the date and time of manufacture. Specifically, for example, the price change unit 101 discounts a product specified by a product code by one yen every time one hour has elapsed from the time point when five hours elapsed from the date and time of manufacture. The processing by the price change unit 101, i.e., the updating of the current price of the product for which the discount rule is set, is performed all at once, for example, every hour.

The acquisition unit 102 extracts (acquires), when the controller 10 receives an individual item code from the user terminal 5, information regarding the product specified by the individual item code from the product information 153 stored in the storage device 15.

The information transmission unit 103 transmits the product information acquired by the acquisition unit 102 to the user terminal 5 that is the source of the individual item code as a response to the request (inquiry information).

The registration processing unit 109 performs product registration in accordance with the operation received by the user terminal 5. The product registration means that the information regarding the product acquired by the acquisition unit 102 is stored in a predetermined storage region (e.g., a storage region provided in the storage device 15) as a transaction target. The price of the product adopted at the time of this product registration is the current price.

Figure 5:
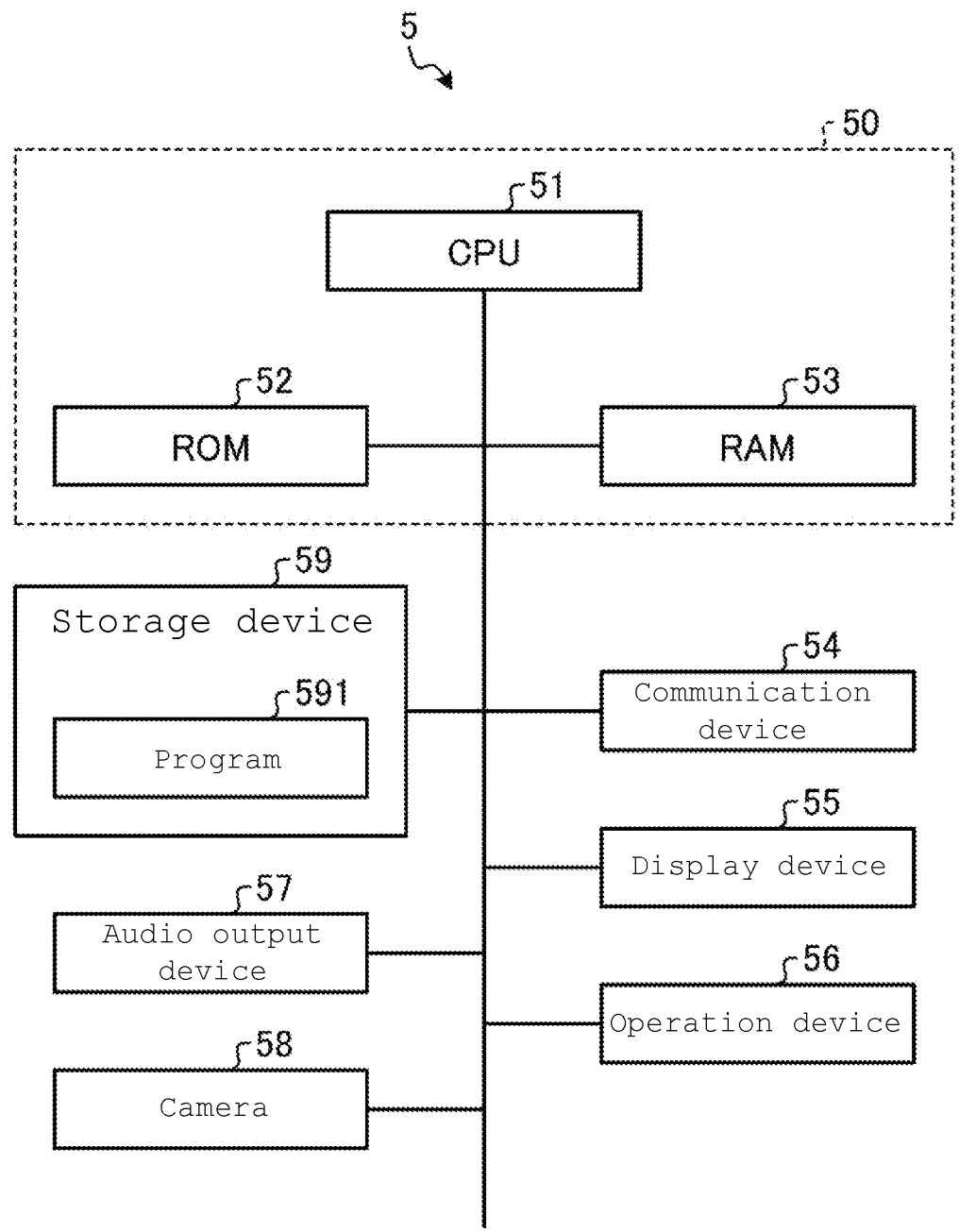
FIG. 5 is a diagram showing an example of a hardware configuration of a user terminal according to the embodiment.

FIG. 5 is a diagram showing an example of a hardware configuration of the user terminal 5. As shown in FIG. 5, the user terminal 5 includes a CPU 51, a ROM 52, a RAM 53, a communication device 54, a display device 55, an operation device 56, an audio output device 57, a camera 58, and a storage device 59.

The CPU 51 is an example of a processor and integrally controls the operation of the user terminal 5. The ROM 52 stores various programs. The RAM 53 is a work space in which programs and various types of data are developed by the CPU 51.

The CPU 51, the ROM 52, and the RAM 53 are connected to each other via a bus and constitute a controller 50 having a computer configuration. In the controller 50, the CPU 51 operates in accordance with the program that is stored in the ROM 52 or the storage device 59 and developed into the RAM 53, thereby executing various types of processing. Such a controller 50 is connected to the respective units (the storage device 59, the communication device 54, the display device 55, the operation device 56, the audio output device 57, and the camera 58) via the bus.

The storage device 59 includes, for example, an SSD or a flash memory, and maintains the stored content even when power is cut off. The storage device 59 stores various programs to be executed by the CPU 51 and various types of setting information relating to the operation of the user terminal 5. For example, the storage device 59 stores a program 591 for executing registration processing and payment processing of products in the user terminal 5, which is provided from the server 1, such as an application program (smartphone POS application).

The communication device 54 is a wired or wireless communication interface connectable to the network 3. The communication device 54 communicates with an external apparatus such as the server 1 via the network 3.

The display device 55 is an example of a display attached to the user terminal 5, includes, for example, a liquid crystal display (LCD) or a touch panel display, and displays various types of information in accordance with control of the controller 50.

The operation device 56 includes various operation buttons and outputs key information corresponding to the operation of an operator to the controller 50. Note that the operation device 56 includes a touch panel provided on a display surface of the display device 55.

The audio output device 57 is a device for audio output, such as a speaker, and outputs audio in accordance with the control of the controller 50.

The camera 58 is an example of a camera attached to the user terminal 5 and is a digital camera including an image sensor such as a charge-coupled device (CCD) image sensor and a complementary MOS (CMOS) image sensor.

Note that the hardware configuration of the user terminal 5 is not limited to the example shown in FIG. 5. For example, in the case where the user terminal 5 is a smartphone, the user terminal 5 may include a communication module such as 4G and 5G or an audio input device such as a microphone.

Figure 6:
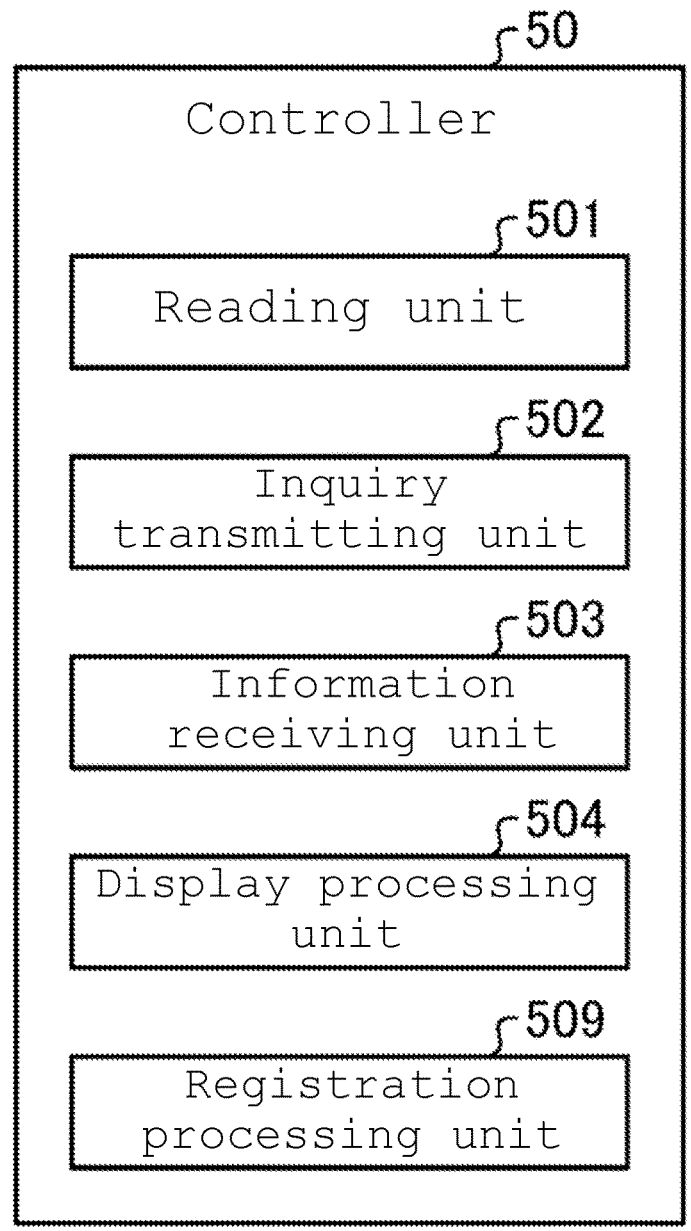
FIG. 6 is a diagram showing an example of a functional configuration of a controller of the user terminal according to the embodiment.

FIG. 6 is a diagram showing an example of a functional configuration of the controller 50 of the user terminal 5. The controller 50 functions as a reading unit 501, an inquiry transmitting unit 502, an information receiving unit 503, a display processing unit 504, and a registration processing unit 509 when the CPU 51 executes the program 591.

The reading unit 501 decodes the code symbol 9 included in an image captured by the camera 58 to obtain an individual item code. The inquiry transmitting unit 502 transmits the individual item code output by the reading unit 501 to the server 1 to make an inquiry (request) for information regarding the product specified by the individual item code.

The information receiving unit 503 receives information that is transmitted by the server 1 to the user terminal 5 as a response to the inquiry (request). The display processing unit 504 displays the information received by the information receiving unit 503 on the display device 55.

The registration processing unit 509 transmits, when the operation device 56 receives an operation for registering a product while information regarding the product is displayed on the display device 55, information indicating that the product being displayed on the display device 55 is to be registered to the server 1.

Figure 7:
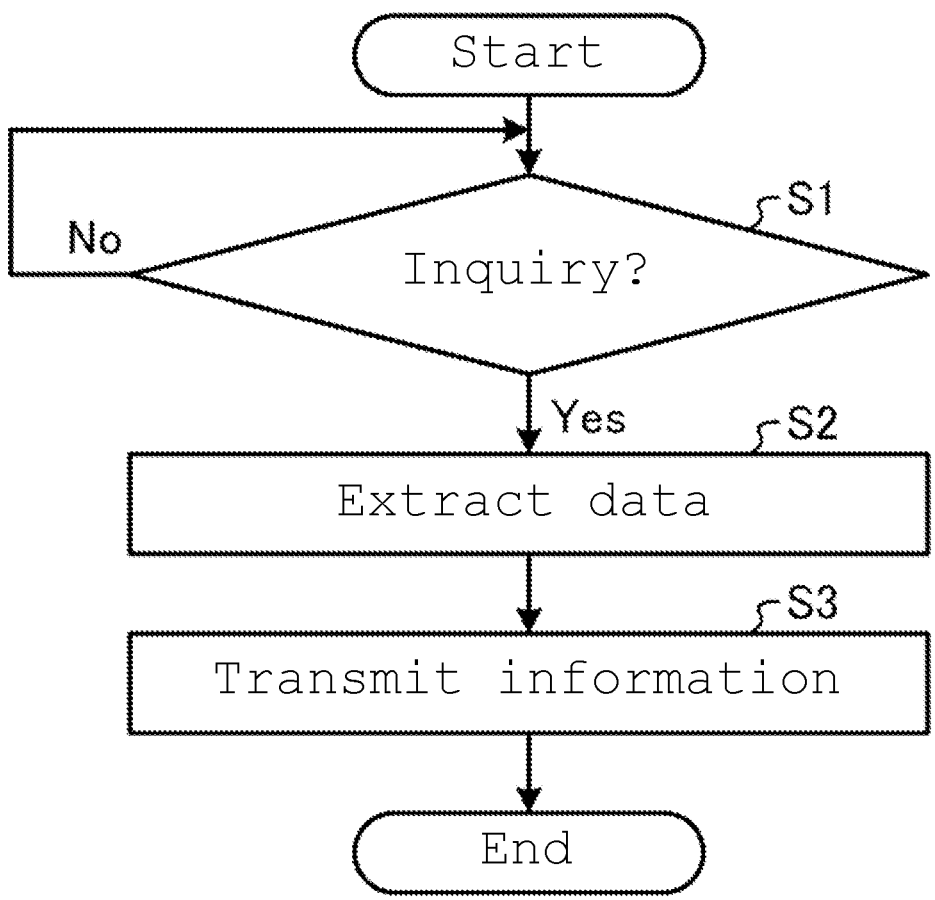
FIG. 7 is a flowchart showing an example of processing performed by the server according to the embodiment.

FIG. 7 is a flowchart showing an example of processing performed by the server 1. In Step S1, the controller 10 of the server 1 stands by for inquiry information (request) from the user terminal 5 (No in Step S1). When receiving inquiry information from the user terminal 5 (Yes in Step S1), the processing of the controller 10 proceeds to Step S2. In Step S2, the controller 10 extracts data on the basis of the individual item code included in the inquiry information. More specifically, the controller 10 serves as the acquisition unit 102 to extract (acquire) the information regarding the product specified by the individual item code from the product information 153 of the storage device 15. Next, in Step S3, the controller 10 transmits the information acquired in Step S2 to the user terminal 5 and finishes this processing.

Figure 8:
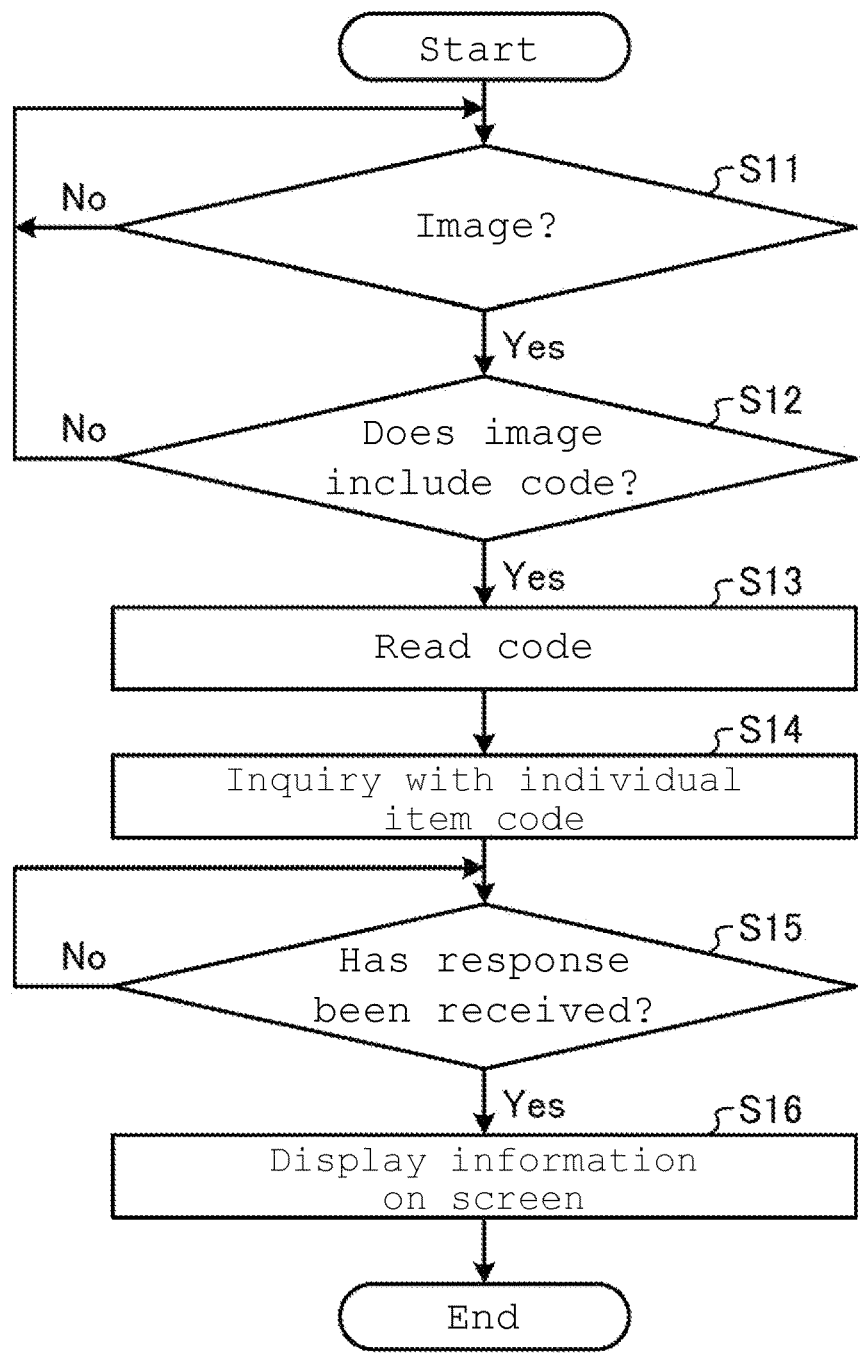
FIG. 8 is a flowchart showing an example of processing performed by the user terminal according to the embodiment.

FIG. 8 is a flowchart showing an example of processing performed by the user terminal 5. In Step S11, the controller 50 of the user terminal 5 stands by for an image captured by the camera 58 (No in Step S11). When the camera 58 outputs the image of the product 7 (Yes in Step S11), the processing of the controller 50 proceeds to Step S12. In Step S12, the controller 50 determines whether or not the image includes the code symbol 9. In the case where it is determined in Step S12 that the image does not include the code symbol 9 (No in Step S12), the processing of the controller 50 returns to Step S11.

In the case where it is determined in Step S12 that the image includes the code symbol 9 (Yes in Step S12), the processing of the controller 50 proceeds to Step S13. In Step S13, the controller 50 serves as the reading unit 501 to decode the code symbol 9, read the individual item code, and output the read individual item code.

Next, in Step S14, the controller 50 serves as the inquiry transmitting unit 502 to transmit inquiry information together with the individual item code to the server 1. Next, in Step S15, the controller 50 serves as the information receiving unit 503 to stand by for a response to the inquiry from the server 1 (No in Step S15). When the server 1 responds to the inquiry information, the controller 50 serves as the information receiving unit 503 to receive information as the response from the server 1 (Yes in Step S15). Then, in Step S16, the controller 50 displays the received response information and finishes this processing.

Figure 9:
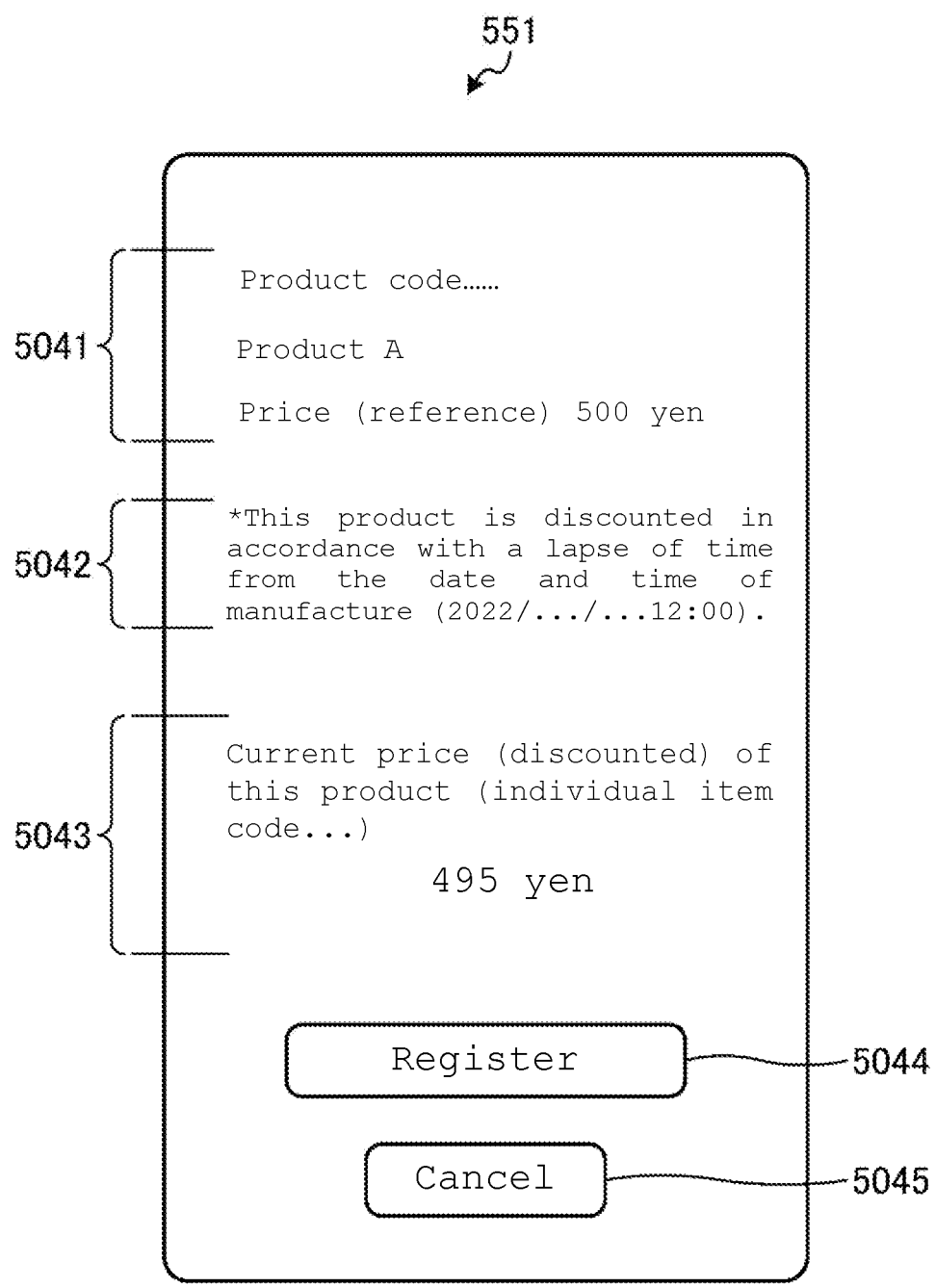
FIG. 9 is a diagram showing an example of a screen displayed by a display device of the user terminal according to the embodiment.

FIG. 9 is a diagram showing an example of a screen 551 displayed on the display device 55 of the user terminal 5. The screen 551 is displayed by the processing of Step S16 described above under the control of the controller 50 as the display processing unit 504. This screen 551 includes a product information display region 5041, a discount information display region 5042, a current price display region 5043, a registration button 5044, and a cancel button 5045.

The product information display region 5041 is a region where information regarding the product specified by the individual item code read by the reading unit 501 of the controller 50 is displayed. For example, a product code, a product name, and a unit price are displayed in this product information display region 5041.

In the discount information display region 5042, the fact that a discount rule is applied to the product indicated by the information in the product information display region 5041 and an outline of the discount rule are displayed. Note that the discount information display region 5042 is omitted in the case of a product to which no discount rule is applied.

The current price display region 5043 is a region where the current price of the product specified by the individual item code read by the reading unit 501 of the controller 50 is displayed.

The registration button 5044 is a button for receiving an operation of registering, as a transaction target, the product specified by the individual item code read by the reading unit 501 of the controller 50. The cancel button 5045 is a button for receiving an operation of returning to the previous screen without performing the registration. When the registration button 5044 and the cancel button 5045 are operated, the output of the touch panel (operation device 56) is received and information regarding the operated button is transmitted to the server 1.

In accordance with such a first embodiment, as the price of the product managed by the individual item code, the current price updated in accordance with the date and time of manufacture and the discount rule is automatically applied. Therefore, it is possible to change the price without manual work and without timeframe restrictions. Further, in accordance with the first embodiment, an individual item code can be obtained when a customer images the code symbol 9 of the product 7 with the user terminal 5 and the customer can refer to the discount rule and the current price associated with the individual item code. Therefore, it is possible to inform the customer of price changes (e.g., discounts) without direct display on the product 7.

Note that the above-mentioned embodiment can be modified as appropriate and implemented by changing part of the configurations or functions of the above-mentioned respective apparatuses. In this regard, some modifications according to the above-mentioned embodiment will be described below as other embodiments. Note that in the following, points different from the above-mentioned embodiment will be mainly described and detailed description of the points common to the content that has already been described will be omitted. Further, modifications described below may be individually implemented and may be implemented in combination as appropriate.

Second Embodiment

Figure 10:
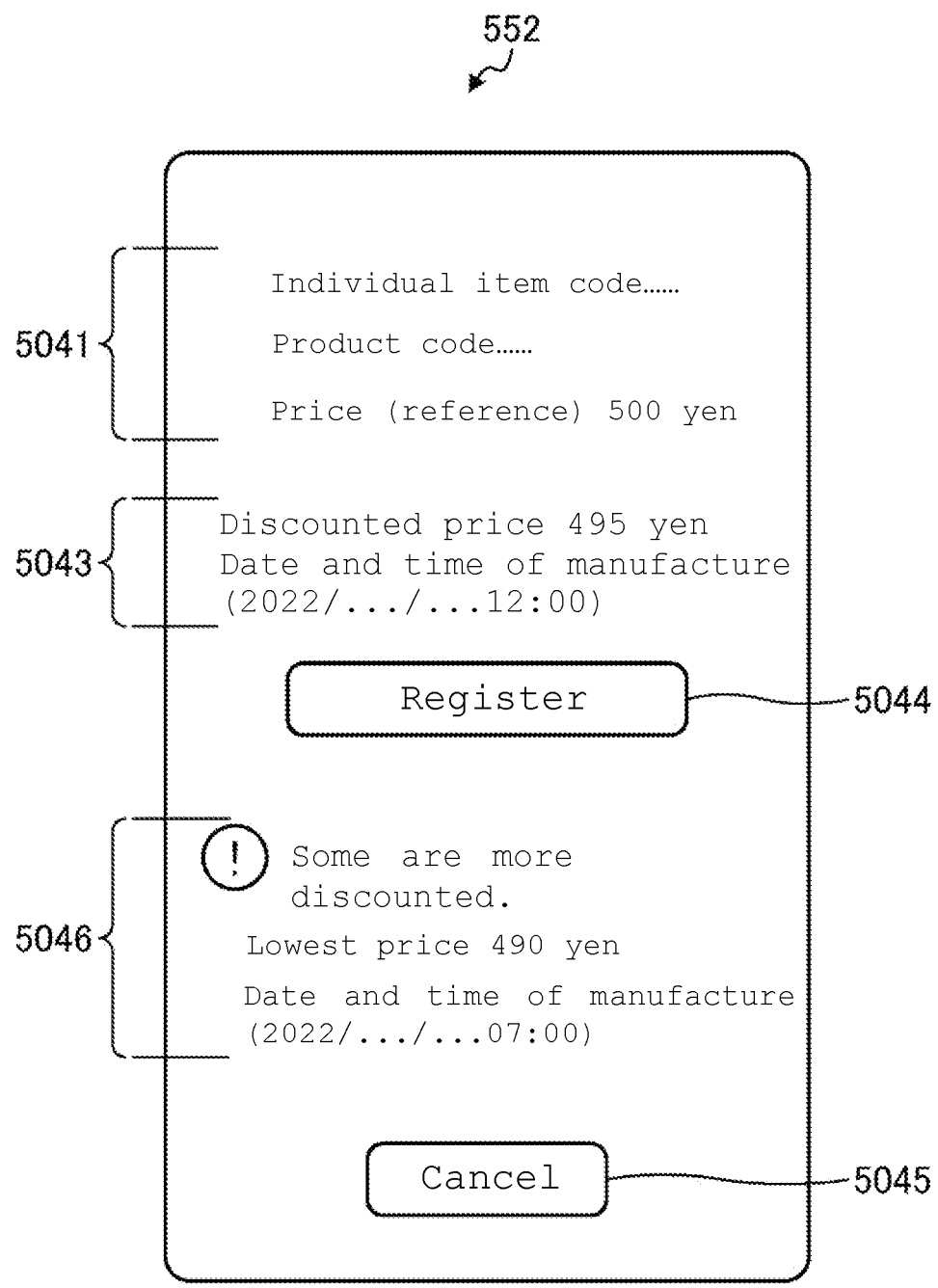
FIG. 10 is a diagram showing an example of the screen displayed by the display device according to the embodiment.

A second embodiment will be described. FIG. 10 is a diagram showing an example of a screen 552 displayed on the display device 55 according to a second embodiment. The screen 552 is displayed by the processing of Step S16 described above under the control of the display processing unit 504 of the controller 50. This screen 552 includes a lowest price display region 5046 instead of the discount information display region 5042 in FIG. 9.

In the lowest price display region 5046, information (at least the current price and the date and time of manufacture) regarding the product having the lowest current price, of the products having the same product code and different individual item codes as/from those of the product specified by the individual item code read by the reading unit 501 of the controller 50, is displayed. Note that in the case where the price of the product specified by the individual item code read by the reading unit 501 of the controller 50 is the lowest price, the lowest price display region 5046 may be omitted.

In accordance with such a second embodiment, it is possible to inform a customer of not only the current price of the product read by the user terminal 5 of the customer but also that there is a more discounted product even though it is the same product.

Third Embodiment

Figure 11:
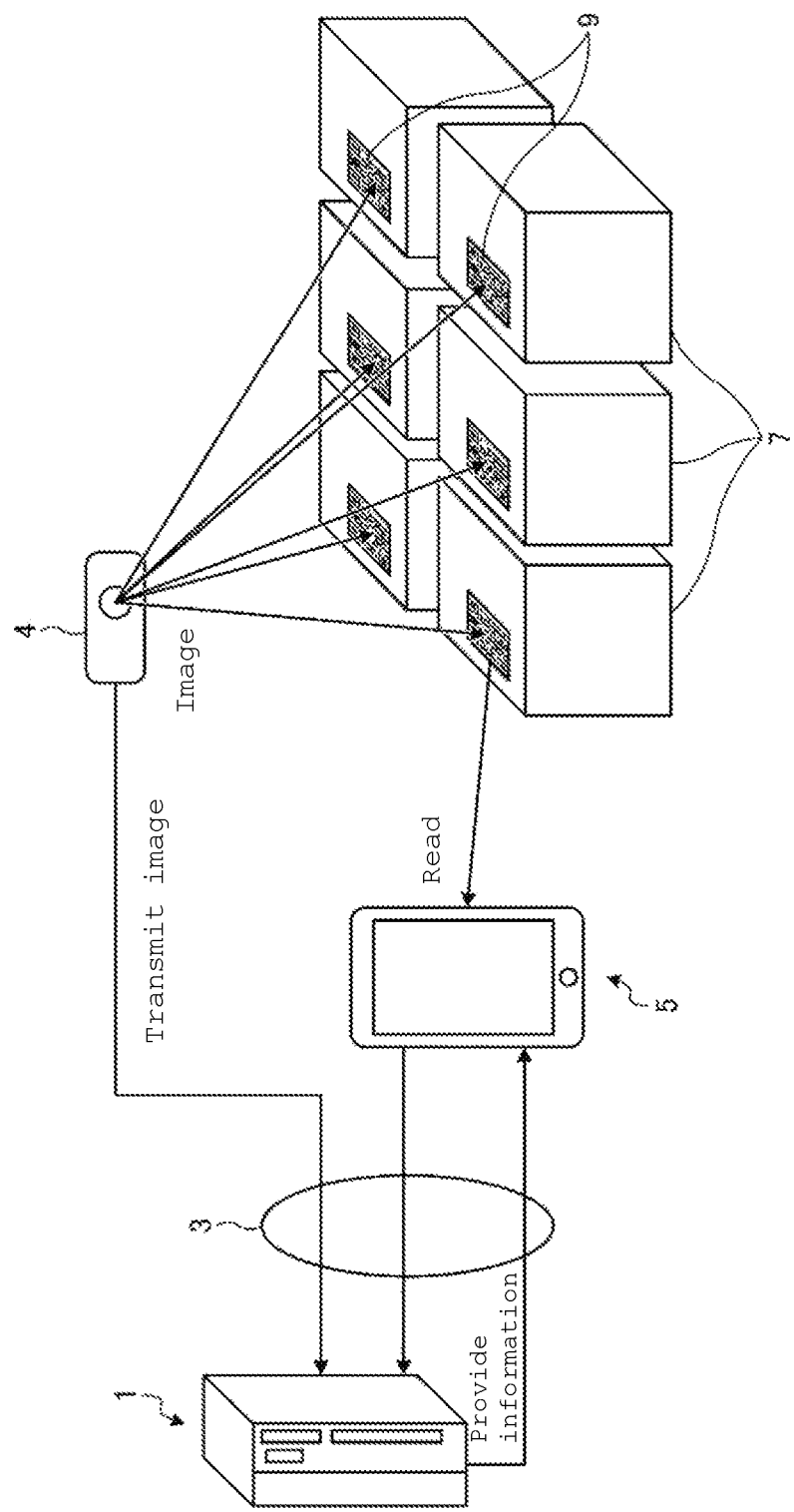
FIG. 11 is a schematic diagram showing a configuration of an individual item price management system according to an embodiment and a flow of information between configurations.

A third embodiment will be described. FIG. 11 is a schematic diagram showing a configuration of an individual item price management system according to a third embodiment and a flow of information between configurations.

The system according to this embodiment includes a reader 4 that performs batch reading of the code symbols 9 of a plurality of products 7 lined up on a display shelf. The image captured by the reader 4 is transmitted to the server 1 via the network 3.

Figure 12:
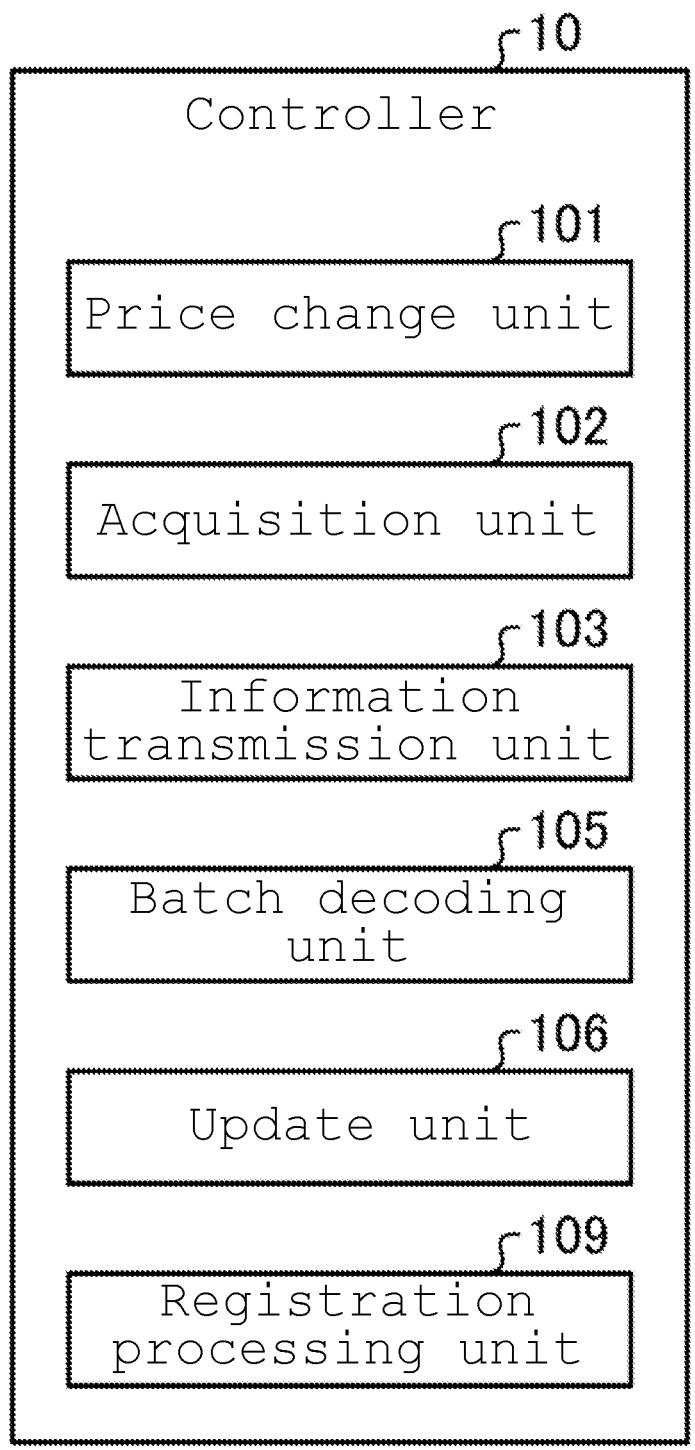
FIG. 12 is a diagram showing an example of a functional configuration of a control unit of a server according to the embodiment.

FIG. 12 is a diagram showing an example of a functional configuration of the controller 10 of the server 1. The controller 10 functions as a batch decoding unit 105 and an update unit 106 in addition to the price change unit 101, the acquisition unit 102, the information transmission unit 103, and the registration processing unit 109 when the CPU 11 executes the program 151.

The batch decoding unit 105 cuts out one or more code symbols 9 from the image received from the reader 4 and decodes the one or more code symbols 9 to obtain one or more individual item codes.

The update unit 106 changes the stock status associated with the product 7 of the individual item code that has disappeared from the display shelf, of the product information 153, to one indicating that it is not on the display shelf (e.g., "out of stock"). Whether or not it is on the display shelf is determined by whether or not the code symbol 9 has been read by the reader 4.

The reading by the reader 4 is repeated every predetermined period. In the case where the code symbol 9 that has been read until the previous time cannot be read, the stock status associated with the individual item code indicated by the code symbol 9 is changed to "out of stock" or the like.

Figure 13:
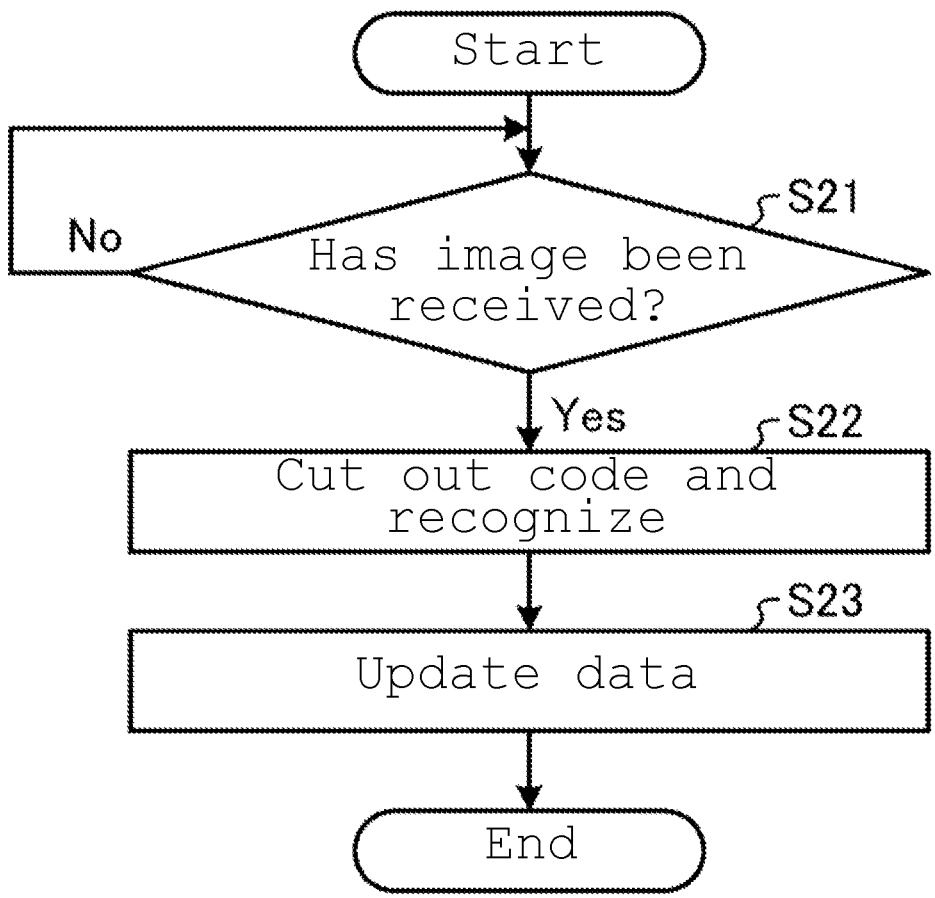
FIG. 13 is a flowchart showing an example of processing performed by the server according to the embodiment.

FIG. 13 is a flowchart showing an example of processing performed by the server 1. The controller 10 stands by for receiving an image from the reader 4 (No in Step S21). When an image is received from the reader 4 (Yes in Step S21), the processing of the controller 10 proceeds to Step S22. In Step S22, the controller 10 serves as the batch decoding unit 105 to cut out one or more code symbols 9 from the received image and decode (recognize) the one or more code symbols 9. Next, in Step S23, the controller 10 serves as the update unit 106 to change the stock status associated with the individual item code that cannot be read by the reader 4 to "out of stock" or the like.

In accordance with such a third embodiment, it is possible to accurately reflect the stock status of the display shelf in the product information 153.

Note that although the reader 4 according to this embodiment is responsible for up to imaging, the reader 4 may function also as the batch decoding unit 105 in implementing the embodiment.

Fourth Embodiment

Figure 14:
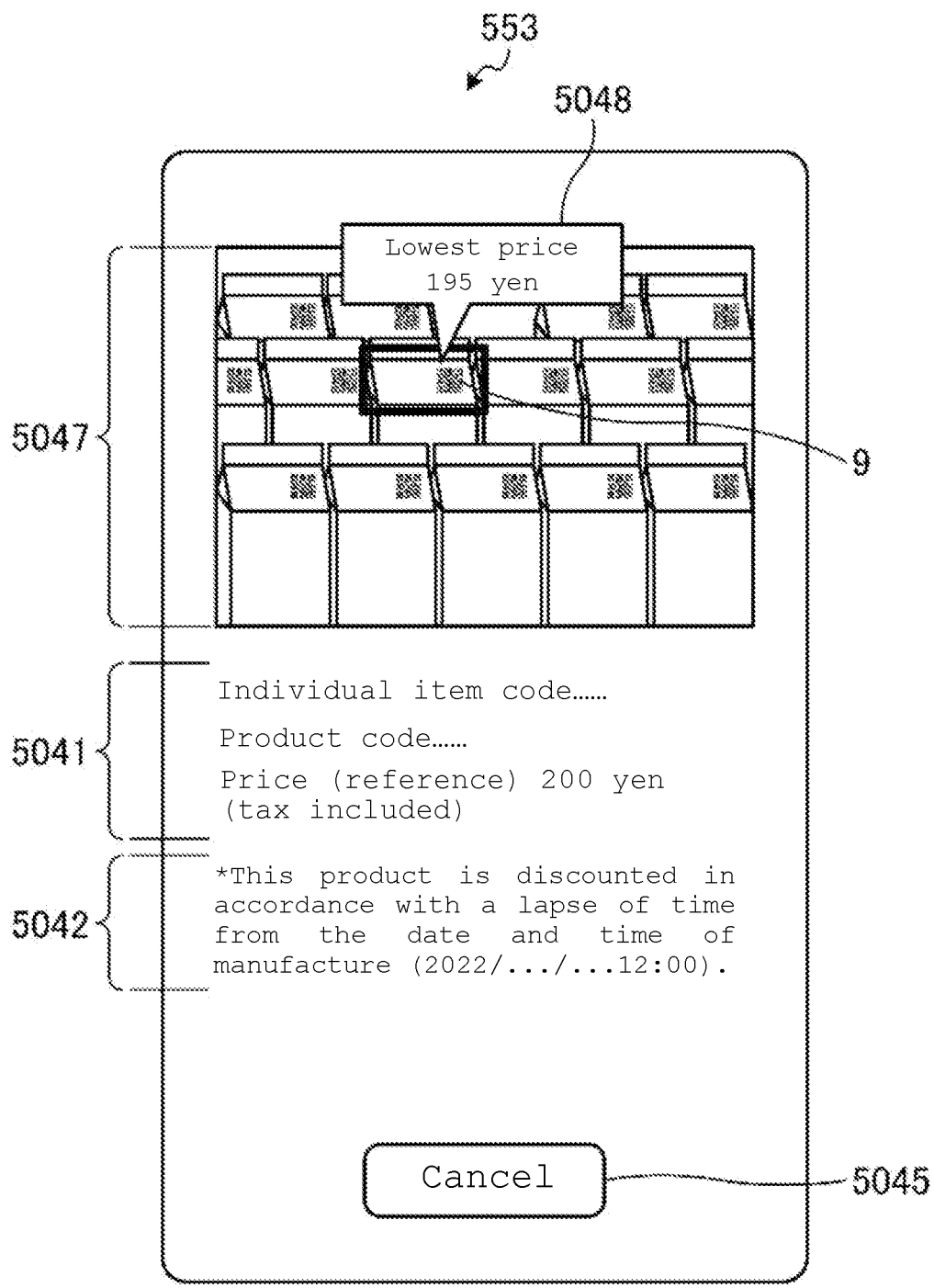
FIG. 14 is a diagram showing an example of a screen displayed by a display device according to the embodiment.

A fourth embodiment will be described. FIG. 14 is a diagram showing an example of a screen 553 displayed on the display device 55 according to a fourth embodiment. The screen 553 is displayed by the processing of Step S16 of the flowchart shown in FIG. 8 under the control of the display processing unit 504 of the controller 50. The screen 553 includes a captured image display field 5047 for displaying the image captured by the camera 58 of the user terminal 5.

FIG. 14 is for the case where an image of a plurality of products 7 having the same product code is displayed in the captured image display field 5047. In this case, on the screen 553, the current price display region 5043 and the registration button 5044 are not displayed and a lowest price display label 5048 is superimposed and displayed on the image of the captured image display field 5047. The lowest price display label 5048 is an example of a mark image.

The controller 10 according to this embodiment serves as the acquisition unit 102 to cut out one or more code symbols 9 from the image received from the user terminal 5 and decode the one or more code symbols 9 to obtain one or more individual item codes. The controller 10 further specifies the position in the image of the product 7 of the individual item code having the current price of the lowest price. The controller 10 then adds the lowest price display label 5048 to the specified position. Note that the product 7 may be made conspicuous and easily recognized by, for example, displaying a frame surrounding the product 7 at the position at which the lowest price display label 5048 has been added.

In accordance with such a fourth embodiment, it is possible to inform a customer of which current price of the same products displayed side by side is the lowest price.

Modification

Note that although the code symbol 9 has been described to hold an individual item code (identification information) in the above-mentioned embodiments, a wireless tag attached to a product may hold identification information in implementing the embodiment. Further, in the case where identification information is held by a wireless tag, as the reader 4 in the fourth embodiment, one capable of communicating with the antenna of the wireless tag is adopted. Further, the user terminal 5 is capable of reading the identification information stored in the wireless tag as long as it includes a communication I/F supporting near field communication (NFC). Further, even in the case where a wireless tag is attached to a product, the code symbol 9 may be displayed as well. In this case, the user terminal 5 may perform reading using the code symbol 9 and the reader 4 may perform reading using the wireless tag.

The wireless tag is an electronic tag such as a radio frequency (RF) tag. The wireless tag includes an integrated circuit (IC) chip for storing information and an antenna. The wireless tag transmits tag information stored in the IC chip in accordance with the radio wave received from a wireless-tag reading apparatus. For example, in the wireless tag, the individual item code of the product to which the wireless tag is attached is stored.

Further, a discount rule may be adjusted using the sales status included in the product information 153 in the embodiment described above. For example, the discount rule does not necessarily need to be applied to the product with the sales status "good" and a large amount of price reduction per unit time may be set for the product with the sales status "bad".

Further, although the price change in accordance with a predetermined rule according to a lapse of time from a reference date and time has been described using a discount as an example in the above-mentioned embodiments, the price may be increased in implementing the embodiment. It is conceivable that the implementation with the price increase can be applied to a product whose value increases over time such as wine.

Further, although the user terminal 5 has been described as an example of an information terminal in the embodiments described above, the present technology is not limited thereto in implementing the embodiment. In implementing the embodiment, the information terminal may be a terminal apparatus that is lent from a store and available in the store, such as a smartphone terminal and a tablet type terminal, or a display unit of a cart POS.

Note that the above-mentioned terminal apparatus lent from the store is for performing product registration and the like by a user himself/herself, similarly to the user terminal 5 according to the embodiment.

Further, the display unit of a cart POS has a function similar to that of the above-mentioned terminal apparatus lent from the store. The cart POS is a shopping cart that is installed in a store and used to carry products to be purchased by a user, the above-mentioned display unit being attached to the shopping cart. The display unit of the cart POS includes a display device that displays information for a user. In this display unit, a touch panel that receives an operation corresponding to the display content of the display device is provided on the surface of the display device in some cases.

The program executed by the respective apparatuses according to the embodiments described above is incorporated in a ROM or the like in advance and provided. The program executed by the respective apparatuses according to the above-mentioned embodiments may be recorded on a computer-readable recording medium such as a CD-ROM, a flexible disk (FD), a CD-R, and a digital versatile disk (DVD) in a file in an installable format or an executable format and provided.

Further, the program executed by the respective apparatuses according to the above-mentioned embodiments may be provided by storing the program on a computer connected to a network such as the Internet and downloading it via the network. Further, the program executed by the respective apparatuses according to the above-mentioned embodiments may be provided or delivered via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image-based stock and price management system, comprising:
    a reader positioned to capture, from above, a product display region of a store, where products of a same kind that are accompanied with different individual product identifying two-dimensional (2D) codes placed thereon are displayed;
    a mobile customer terminal; and
    a server communicable with the reader and the mobile customer terminal over a network, wherein
    the mobile customer terminal includes
       a camera, a first communication device that communicates with the sever, a display device, and a first controller configured to decode one or more individual product identifying 2D codes included in a first image captured by the camera, into one or more individual product identifiers corresponding thereto, transmit an inquiry including the one or more individual product identifiers to the server via the first communication device, receive a response to the inquiry from the server via the first communication device, and display, on the display device, a price information screen based on the response, and the server includes a second communication device that communicates with the mobile customer terminal, a storage device that stores product information, the product information including, with respect to each product in the stock, a reference date and time, an original price of the product, and a current price of the product in association with an individual product identifier of the product, and a second controller configured to decode individual product identifying 2D codes included in a second image captured by the reader into individual product identifiers corresponding thereto to determine in-stock products, with respect each of the in-stock products, update the current price included in the product information stored in the storage device in accordance with a predetermined rule according to a lapse of time from the corresponding reference date and time included in the product information, receive the inquiry from the mobile customer terminal via the second communication device, acquire, from the storage device, a current price of each product that is in stock and identified with one of the one or more individual product identifiers included in the inquiry, and transmit the acquired current price to the information terminal as the response, when the first image includes a single product, the price information screen indicates the current price of the single product, and when the first image includes a plurality of products, the price information screen includes the first image with an overlaid mark specifying an in-stock product at a lowest current price and a label indicating the lowest current price.

\* \* \* \* \*